(12) United States Patent
Silva et al.

(10) Patent No.: US 6,801,215 B1
(45) Date of Patent: Oct. 5, 2004

(54) HARDWARE-ASSISTED VISIBILITY-ORDERING ALGORITHM

(75) Inventors: Claudio T. Silva, Murray Hill, NJ (US); Bin Wei, Bridgewater, NJ (US)

(73) Assignee: AT&T Corp., New York, NY (US)

( * ) Notice: Subject to any disclaimer, the term of this patent is extended or adjusted under 35 U.S.C. 154(b) by 115 days.

(21) Appl. No.: 09/995,683

(22) Filed: Nov. 29, 2001

(51) Int. Cl.[7] ................................................. G09G 5/02

(52) U.S. Cl. ..................................... 345/629; 345/641

(58) Field of Search ................................ 345/629–641, 345/418–428, 581–606, 611, 614; 382/164–167, 174, 269

(56) References Cited

U.S. PATENT DOCUMENTS

| | | | | |
|---|---|---|---|---|
| 5,617,114 A | * | 4/1997 | Bier et al. .................. | 345/634 |
| 5,720,020 A | * | 2/1998 | Tannenbaum et al. ...... | 345/629 |
| 5,831,615 A | * | 11/1998 | Drews et al. ................ | 345/768 |
| 6,151,030 A | * | 11/2000 | DeLeeuw et al. ........... | 345/592 |

OTHER PUBLICATIONS

A. Mammen, "Transparency and Antialiasing Algorithms Implemented with the Virtual Pixel Maps Technique", IEEE Computer Graphics & Applications, pp. 43–55, Jul. 1989.*

P.L. Williams, "Visibility Ordering Meshed Polyhedra", ACM Transactions on Graphics, 11(2): 103–126, Apr. 1992.*

* cited by examiner

*Primary Examiner*—Michael Razavi
*Assistant Examiner*—Thu-Thao Havan (57) ABSTRACT

A hardware assisted system and method for computing a visibility ordering of a set of primitives and rendering the set of primitives is described, comprising the steps of and means for locating primitives potentially in a layer and removing occluded primitives from the layer. The hardware assisted locating step further includes the steps of initializing hardware buffers, initializing a layer number, assigning the layer number to each primitive, extracting a subset of the primitives from the set of primitives assigned to the layer number, and storing the subset of primitives in a color buffer. The hardware assisted removing step further includes the steps of reading the color buffer to locate all primitives of the layer number, traversing a pixel array of the subset of primitives to obtain primitive ids and depth complexities, testing depth complexity for each primitive using a stencil buffer, removing those primitives from the layer number if the depth complexity greater than one, re-inserting the primitives with a depth complexity greater than one back into the set of primitives, rendering the primitives of the layer number, incrementing the layer number, determining if any primitives have been extracted from the set of primitives in the layer number, halting execution if no primitives have been removed from the layer number, and repeating all of the above steps.

17 Claims, 7 Drawing Sheets

OpenGL imaging pipeline

FIG. 6(b)

HARDWARE-ASSISTED VISIBILITY-ORDERING ALGORITHM

FIELD OF THE INVENTION

The present invention relates generally to the field of computer graphics and in particular to a method for iteratively extracting layers from a current set of primitives in order to render the primitives in an order, which can be front-to-back or back-to-front.

BACKGROUND OF THE INVENTION

One of the earliest, if not the earliest, solutions to computing a visibility-order, which is the basis for several recent techniques starts with a rough ordering in z (depth) of the primitives. Then for each primitive, the algorithm fine tunes the ordering by checking whether other primitives actually precede it in the ordering.

The BSP-tree, which is a data structure that represents a hierarchical convex decomposition of a given space, was then developed. Each node v of a BSP-tree T corresponds to a convex polyhedral region, $P(v) \in R^3$; the root node corresponds to all of $R^3$. Each non-leaf node v also corresponds to a plane, h(v), which partitions P(v) into two subregions, $P(v+)=h+(v) \# P(v)$ and $P(v-)=h-(v) \cap P(v)$, corresponding to the two children, v+ and v- of v. Here, h+(v) (respectively, h-(v)) is the half-space of points above (respectively, below) plane h(v). It was demonstrated that BSP-trees can be used for obtaining a visibility ordering of a set of objects (or, more precisely, an ordering of the fragments into which the objects are cut by the partitioning planes). The key observation is that the structure of the BSP-tree permits a simple recursive algorithm for "painting" the object fragments from back to front: If the viewpoint lies in, say, the positive half-space h+(v), then (recursively) the fragments stored in the leaves of the sub-tree rooted at v− are painted first, then the object fragments $S(v) \in h(v)$, and then (recursively) the fragments stored in the leaves of the sub-tree rooted at v+.

It is important to note that the BSP-tree does not actually generate a visibility order for the original primitives, but for fragments of them. It has been shown how to recover the visibility order from the sorted fragments. There are a few issues in using BSP-trees for visibility-ordering. Building a BSP-tree is a computationally intensive process. Thus, handling dynamic geometry is a challenge. Using techniques from the field of "kinetic"data structures, an efficient extension of BSP-trees for handling moving primitives was developed. At this time, this technique requires a priori (actual analytical) knowledge of the motion of the geometry to efficiently perform local changes on the BSP-tree as the primitives move.

Another technique for visibility order, wherein a well-chosen (small) set of ray shooting queries are performed, is known. The ray shooting queries compute for each primitive (at least) its successor and predecessor in the visibility ordering. By running a topological sort on these pair-wise relations, it is possible to recover a visibility order. One of the shortcomings of this technique is that it might actually obtain a larger portion of the visibility graph than necessary to compute the ordering. Since the ray shooting queries are relatively expensive both in time and memory, this can be inefficient.

An incremental visibility sorting: algorithm has also been presented, similar in some respects to the algorithm using a rough ordering in z (depth) and then fine tuning the ordering. This algorithm, despite having a worst case running time of $O(n^4)$, is shown to be quite fast in practice. In order to cull the number of visibility relations that need to be maintained, several optimizations, such as the use of kd-trees (hierarchical data decomposition trees) and the tracking of overlaps of the convex hulls of the geometric primitives are performed. Their algorithm is able to explore temporal coherency and, in fact, is optimized for dynamic geometry. This algorithm also proposes a technique for correct rendering in the presence of cycles.

Another related technique is known, which uses a multi-pass rendering technique with a "moving" depth buffer to render transparent objects.

Building complicated data structures to solve the visibility-ordering problem is a fairly difficult task. Given that interactivity is of utmost importance in most applications, it would be prudent to try and solve this problem in hardware at some pre-specified resolution. As other researchers have found exploiting the ever-faster graphics hardware available in workstations and PCs, can lead to simpler, and more efficient solutions to rendering problems. The present invention is motivated by this trend.

SUMMARY OF THE INVENTION

The initial motivation for the present invention comes from volume rendering, but the present invention has other applications, which include image-based rendering acceleration, animations with selective display, efficient rendering with transparency. The main contribution of the present invention is a method for computing a visibility ordering of a set of (acyclic) primitives by using features of the graphics hardware.

The present invention is, therefore, a hardware-assisted visibility ordering algorithm. From a given viewpoint, a (back-to-front) visibility ordering of a set of objects is a partial order on the objects such that if object A obstructs object B, then B precedes A in the ordering. Note, however, if the visibility ordering is front-to-back then if object A obstructs B, then B precedes A in the ordering and B<p A. Such orderings are useful because they are the building blocks of other rendering algorithms such as direct volume rendering of unstructured grids. The conventional way to compute the visibility order is to build a set of visibility relations (e.g., B<p A), and then run a topological sort on the set of relations to actually get the partial ordering. The present invention instead works by assigning a layer number to each primitive, which directly determines the visibility ordering. Objects that have the same layer number are independent, and have no obstruction between each other. A method, which exploits a combination of the z– and stencil buffers to compute the layer number of each primitive, is used. One application of the method of the present invention is to obtain a fast unstructured volume rendering algorithm. In an exemplary embodiment the present invention is implemented in OpenGL as well as described in terms of pseudo code.

Most conventional visibility ordering algorithms first build a sufficient set of pair-wise visibility relations (e.g., $B<_p A$), and then in a second phase, a topological sort is needed on the set of relations to actually obtain the ordering. Sufficiency for the present invention is in the sense that it is possible to extend such pair-wise relations into a valid partial order. The technique of the present invention instead works by assigning a layer number to each primitive, which directly determines the visibility ordering. To compute the layer number of each primitive, extensive use is made of the graphics hardware. In particular, a combination of the z– and stencil buffers is exploited.

It is, therefore, an object of the present invention to iteratively extract layers from a set of primitives using programmable hardware in order to render the primitives.

It is a further object of the present invention to use a subdivision scheme to avoid unnecessary reading and scanning of the data.

BRIEF DESCRIPTION OF THE DRAWINGS

The invention is best described with reference to the detailed description and the following figures, where.

DETAILED DESCRIPTION OF THE PREFERRED EMBODIMENTS

Figure 1A:
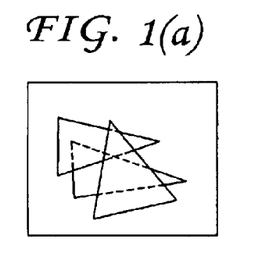
FIG. 1(a) depicts a collection of triangles (polygons).
Figure 1B:
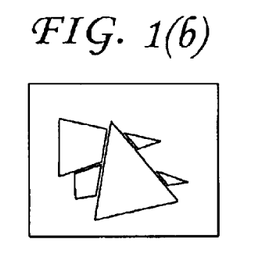
FIG. 1(b) depicts visible triangle (polygon) fragments.
Figure 1C:
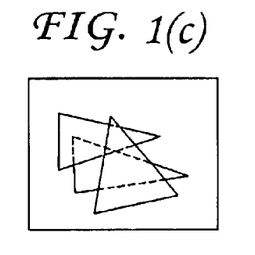
FIG. 1(c) depicts a labeling of the visible triangle (polygon) fragments of FIG. 1(b).

One of the first problems in computer graphics is visibility determination. That is, the visible fragments must be located. FIG. 1(a) depicts a collection of triangles (polygons). FIG. 1(b) depicts visible triangle (polygon) fragments. Another problem in computer graphics is visibility ordering. That is, the fragments must be ordered in some sequence and labeled. FIG. 1(c) depicts a labeling of the visible triangle (polygon) fragments of FIG. 1(b).

It is assumed that a visibility order is to be obtained. That visibility ordering can be front-to-back or back-to-front. The basic idea is to start with the complete collection of primitives, and extract the primitives in layers, that is, a maximally independent set of polygons, which do not relate to each other in the visibility order. The algorithm works by extracting a single layer from the current set of primitives. The algorithm is performed iteratively until no more primitives can be removed. That is, the visibility ordering needs to touch all primitives. At this point, if the set of primitives without a layer number assigned is not empty, one of the following two conditions are true: (a) the remaining (unclassified) primitives are either orthogonal to the viewing direction, hence these primitives cannot really be classified with respect to each other or the rest of the polygons, or (b) the remaining (unclassified) contain a cycle, which the method of the present invention does not handle.

Figure 2:
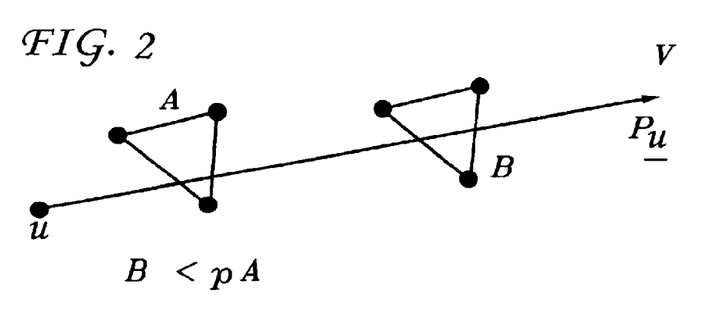
FIG. 2 depicts an example of visibility ordering.

Referring to FIG. 2, which depicts an example of visibility ordering. Let V denote the viewpoint in a front-to-back ordering and let $\rho_u$ denote the ray from V through the point u. A visibility ordering, $<_\rho$, of a set of primitives P={A,B} from a given viewpoint, V $\in$ R, is a linear order on P such that if B $\in$ P visually obstructs A $\in$ P, partially or completely, then B precedes A in the ordering: $B<_\rho A$. In general, $B<_\rho A$, if there exists a ray $\rho_u$ from the viewpoint V such that $\rho \cap B \neq \emptyset$, $\rho \cap A \neq \emptyset$ and the intersection point of $\rho$ with B is before the intersection point with A along the ray.

It is assumed that the OpenGL hardware z-, stencil, and color buffers are available and used. Other equivalent apparatus may be likewise used to similar advantage by one of ordinary skill in the art. The color buffer is eight bit per channel (red, green, blue). The z-buffer is a 24 bit coordinate and is an indication of how far the viewer or viewing plane is from the object. If the object is parallel to the viewing plane then the z-buffer will have a constant value. If the object is skewed from the viewing plane then the z-buffer will not be a constant value. The stencil buffer is an eight bit coordinate and is an indication of the number of times a fragment shows up on a stencil. That is, the stencil buffer is a count of the number of hits by a ray per pixel. The counts are saved on a per pixel basis.

Also, for the sake of simplicity in presentation, it is assumed that the input is composed of triangles, and all the transformation matrices have been handled by the code that is outside of this subroutine. Since no preprocessing is performed, the hardware assisted visibility ordering of the present invention leads to good handling of dynamic geometry. Starting with some basic notation, T is used to denote the set of triangles which have not been classified (notice that it changes over time); F is the current layer being extracted; $T_i$, for a given i, is the set of triangles assigned to be in the ith layer. The algorithm of the present invention is, thus, a multipass algorithm in which the first pass finds polygons, e.g., triangles, potentially in the current layer and the second pass removes occluded polygons from the current layer. Throughout the algorithm, the stencil buffer is sometimes disabled. But whenever it is enabled, it is set to increase the values on the stencil buffer any time a triangle would have been projected into those pixels. In OpenGL, the stencil buffer can be configured as such:

glStencilFunc(GL_ALWAYS, ~0, ~0);

glStencilOp(GL_KEEP, GL_INCR, GL_INCR);

The algorithm of the present invention makes extensive use of the item buffer technique, where triangles are rendered with different colors, from which the original triangles can be identified by reading back the color buffer. This process is termed reading and scanning the buffer herein. Reading buffers refers to performing the glReadPixels call, while scanning a buffer refers to the process of traversing the pixel arrays, to obtain the primitive ids and depth complexity. In a form of pseudo-code, the back-to-front algorithm of the present invention is as follows:

While $T \neq \emptyset$, loop,

1. Clear the color buffer; disable the stencil buffer; configure z-test to GL_LESS, while clearing it to 1.0 (far).
2. Render T.
3. Read back the color buffer, and assign to F any triangle that belongs to the current color buffer. Note that these triangles are potential candidates to be in the current layer, since they might be obscured by some other triangle. (See FIGS. 3(a) and 3(b).)

A necessary and sufficient condition for F to be a layer is that the depth-complexity of F can be at most one. The next phase of the algorithm of the present invention is to use the stencil buffer to test for this condition. In fact, by properly setting the z-buffer, it is possible to identify exactly the triangles which do not belong to the current layer by looking at pixels in the stencil buffer which have a depth-complexity larger than one.

4. Do
    (4a) Clear and enable the stencil buffer; clear the color buffer; configure z-test to GL_GEQUAL, while clearing it to 0.0 (near).
    (4b) Render F.
    (4c) Read back the color and stencil buffers. For each pixel in the stencil buffer which is larger than one, remove the corresponding triangle from F, and re-insert it in T. Since the scene was rendered from the back, a triangle that is covered by one or more other triangles is necessarily removed. Note that if a pixel, which has depth-complexity higher than two, is never located, then the loop can be exited at this point. Otherwise, triangles need to be removed from the back of F, until the depth-complexity of each pixel is at most one.
    (4d) Assign $T_i$=F for the current layer number, and increment the layer number.

While depth-complexity of F>1,

5. In case no triangles have been removed from T since step (1) of the algorithm (that is, the number of elements in T has not changed), the algorithm can be halted, and it can be assumed that the remaining triangles contain a cycle, or they are orthogonal to the view direction.

In a front-to-back algorithm setting the z-test to near indicates that the polygons (triangle) will be rendered first after extraction from the color buffer. Once these objects have been extracted and rendered, the z-buffer is set to far to extract another layer of objects farther back than the layer(s) already extracted. The objects in the next extracted layer would then be rendered. All of the objects that "sit" on a pixel where the stencil buffer is larger than one would be removed from the candidate set of objects extracted. If the stencil buffer was ever larger than two then the set of steps beginning at setting the z-buffer to far would be repeated. If the stencil buffer was not ever larger than two then the execution would commence at the beginning once again. It should be clear that the algorithm will, thus, be equally effective as a front-to-back algorithm.

Figure 3A:
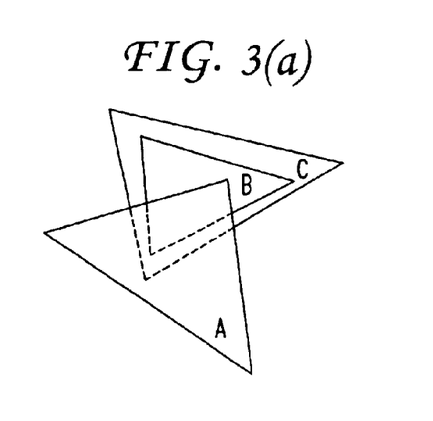
FIG. 3(a) shows triangles that are partially occluded.
Figure 3B:
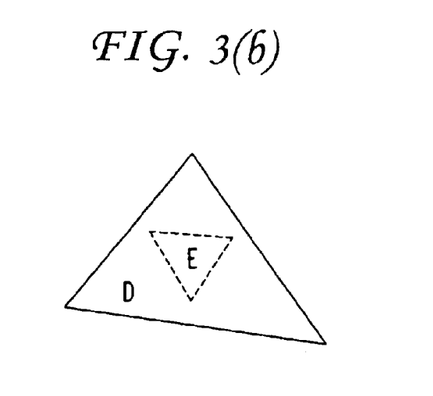
FIG. 3(b) shows the case where the depth complexity of F is always 1.
Figure 3C:
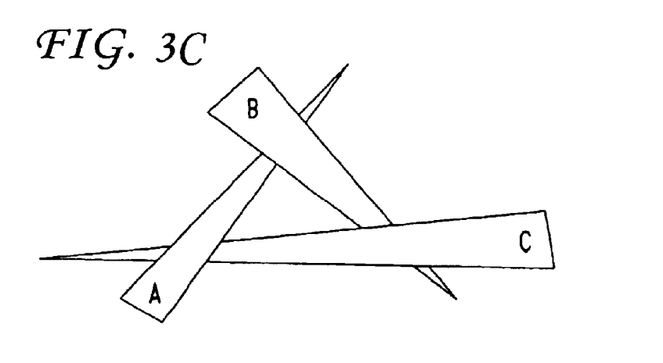
FIG. 3(c) for which no visibility ordering can be determined.
Figure 4A:
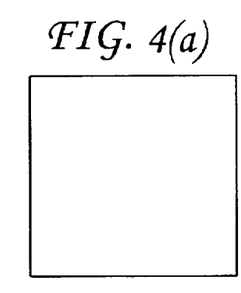
FIG. 4(a) shows the original view of the object.
Figure 4B:
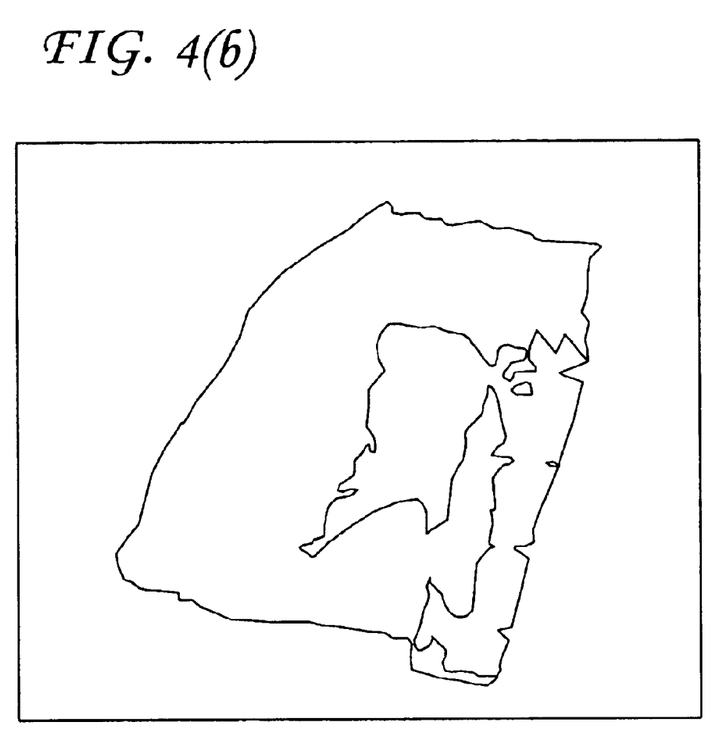
FIG. 4(b) shows the view from the opposite side.
Figure 4C:
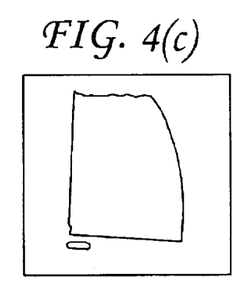
FIG. 4(c) illustrates layer 1 computed with the algorithm of the present invention.
Figure 4D:
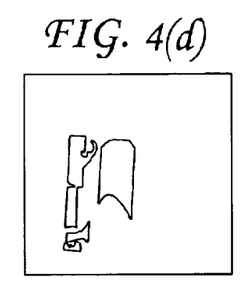
FIG. 4(d) illustrates layer 2 computed with the algorithm of the present invention.
Figure 4E:
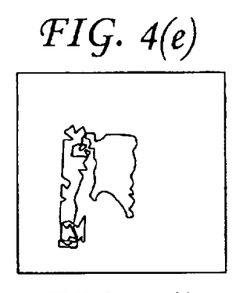
FIG. 4(e) illustrates layer 3 computed with the algorithm of the present invention.
Figure 4F:
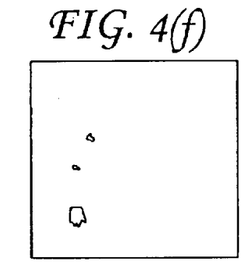
FIG. 4(f) illustrates layer 4 computed with the algorithm of the present invention.
Figure 4G:
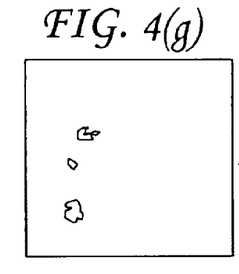
FIG. 4(g) illustrates layer 5 computed with the algorithm of the present invention.
Figure 4H:
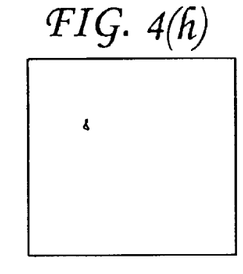
FIG. 4(h) illustrates layer 6 computed with the algorithm of the present invention.
Figure 4I:
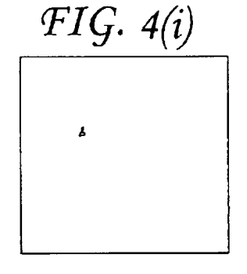
FIG. 4(i) illustrates layer 7 computed with the algorithm of the present invention.
Figure 4J:
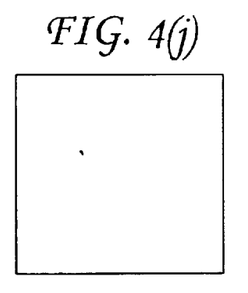
FIG. 4(j) illustrates layer 8 computed with the algorithm of the present invention.
Figure 4K:
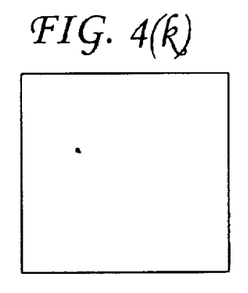
FIG. 4(k) illustrates layer 9 computed with the algorithm of the present invention.

In FIG. 3(a), triangle A occludes parts of triangles B and C, while B is completely occluded by C from the opposite direction. During the first scan, pixels (partially) covering B and C are present in the top layer F. Note that in step (4) of the algorithm of the present invention, triangles are removed from back-to-front. Since C completely occludes B, step 4 is performed multiple times to extract the correct layering. In FIG. 3(b) illustrates the case where the depth complexity of F is always 1. FIG. 3(c) depicts three triangles that are cyclic. That is, no depth can be determined for the three triangles depicted in FIG. 3(c).

FIG. 4 illustrates the layering computed with the algorithm. The triangles are color coded according to the layer to which they belong. In FIG. 4(a) the layering is shown from the view it was computed. In FIG. 4(b), the object was rotated to show the layering from the opposite side. FIGS. 4(c)–(k) show the ten layers computed for this particular view. Note how the 2D footprint of the layers gets smaller and smaller.

It is straightforward to turn the pseudo-code given above of the present algorithm into working C++ code. Assuming n triangles in a scene, the worst-case performance of the present algorithm is $O(n^2)$ reads, and $O(n^3)$ primitives being rendered (such a worst-case would happen if a set of n primitives is ordered front-to-back in such a way that for each primitive in a given layer, there is an enclosing larger primitive behind it). But this is rarely the case. Assuming the depth complexity of the scene is d, the complexity of the algorithm is much closer to O(nd). Each triangle is rendered multiple times, and can potentially be rendered O(d) times. Often, rendering is not the bottleneck. As is shown with the experimental data below, most of the time is spent in reading the color and stencil buffers, and scanning them (depending on image size, triangle count, and architecture limitations). Also, as layers are extracted, the actual footprint of a typical layer decreases quite rapidly (see FIG. 4). Thus, reading and scanning the whole buffers is a waste of time. A simple modification of the present algorithm, which greatly improves the overall performance, is based on the fact that once a pixel is not covered by a triangle after being rendered in step (2) of the back-to-front algorithm, it will never be covered again. Using this fact, it is advantageous to use a subdivision scheme of dividing the image into blocks, and keeping track of pixel coverage in every block, to avoid unnecessary reading and scanning.

The subdivision algorithm is based on the fact that once a pixel is not covered by a triangle after being rendered in step (2) of the back-to-front algorithm, it will never be covered again. Using this fact, it is advantageous to use a subdivision scheme of dividing the image into blocks, and keeping track of pixel coverage in every block, to avoid unnecessary reading and scanning. That is, instead of reading and scanning the "entire "screen every time, a "logical" partitioning of the screen into a collection of independent tiles is defined (that is, for a 512 by 512 screen, the screen can be treated as a collection of several—actually 256—32×32 pieces). It is as though the algorithm operates on 256 screens at a time, instead of a single large image, and each step keeps track of when the buffer is read and scanned and whether any of its pixels were covered, if not, the particular tile is done, and no further operations on the tile are needed to be performed. The layers in FIG. 4 show why such a "subdivision" scheme is advantageous. Basically, the majority of the screen becomes "black" quite fast. In most architectures, the larger the block size, the better the bandwidth in reading back the buffers, although this tends to hit a maximum usually somewhere around a 512×512 block. On the other hand, large blocks may not effectively reduce the unnecessary reading and scanning operations. Based on the results of experiments using the present algorithm, a 64×64 blocking scheme works best on various hardware platforms.

In experiments designed to prove the concepts of the present invention, OpenGL was used to implement the depth sorting algorithm of the present invention. While OpenGL was employed by way of example, other equivalent devices and apparatus may be used to implement the depth sorting algorithm to similar advantage. The performance was tested on several workstations, including SGI Octanes and an HP PC. Only the data collected from the faster Octane and the HP PC are presented. The SGI Octane used had a 300 MHz MIPS 812000 CPU and 512 MB main memory running IRIX 6.5 with an EMXI graphics board. The HP workstation had dual 450 Mhz Pentium II Xeon processors and 384 MB main memory running windows NT 4.0. The graphics subsystem is HP fx6. There are two versions of the algorithm of the present invention. One is an implementation of the depth sorting algorithm and the other is an optimized version with the subdivision scheme for better performance. The experiments were performed on two different window sizes: 256×256 and 512×512. For the optimized version of the present algorithm, the block sizes were also varied. Block sizes of 32×32 and 64×64 were used for the experiments. There are five data sets in the experiments. The program that implemented the algorithm of the present invention was run over a pre-computed set of transformations. The data was collected over 30 frames. Table 1 lists some of the characteristics of these data sets. The data sets included cones, a mannequin, a sphere, a phoenix and Spock.

Figure 5A:
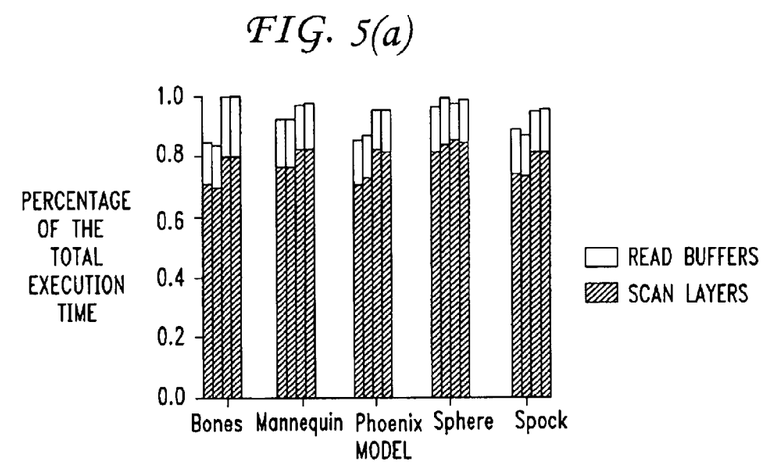
FIG. 5(a) shows the percentage of the overall execution time spent on scanning layers and reading frame buffers of the algorithm without the subdivision scheme on the Octane processor.
Figure 5B:
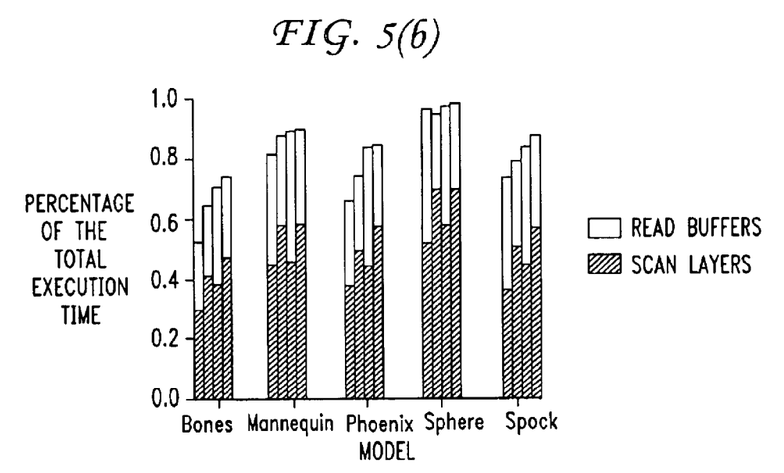
FIG. 5(b) shows the percentage of the overall execution time spent on scanning layers and reading frame buffers of the algorithm with the subdivision scheme on the Octane processor.
Figure 5C:
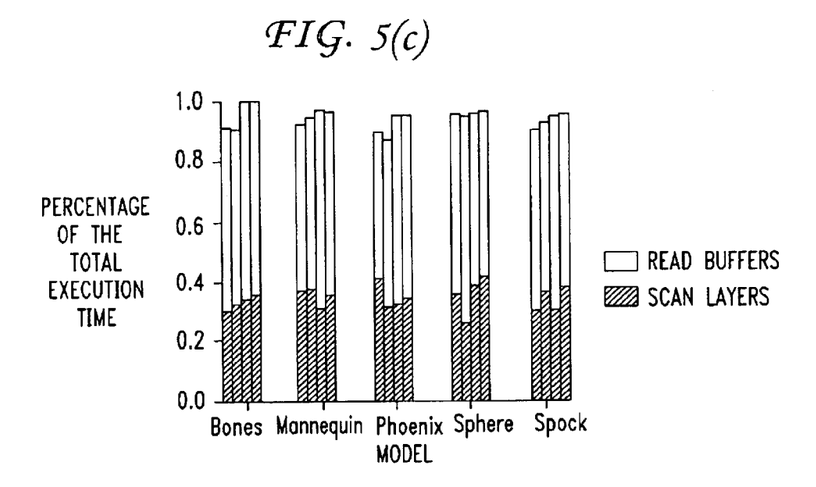
FIG. 5(c) shows the percentage of the overall execution time spent on scanning layers and reading frame buffers of the algorithm without the subdivision scheme on the HP processor.
Figure 5D:
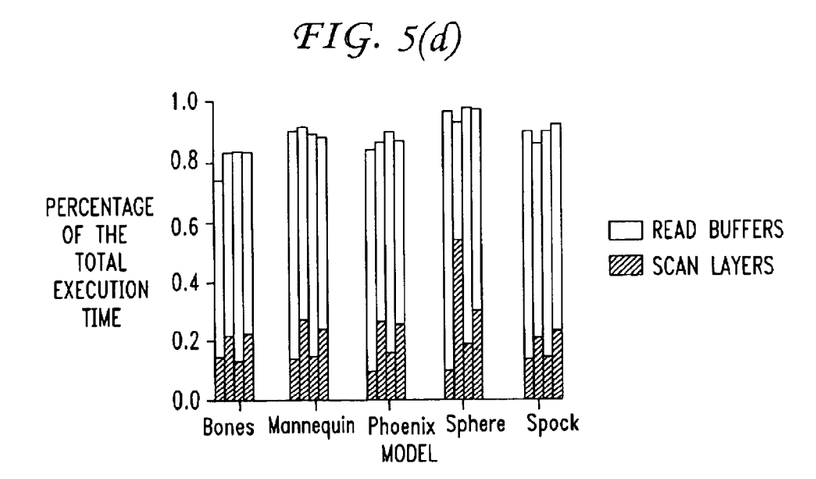
FIG. 5(d) shows the percentage of the overall execution time spent on scanning layers and reading frame buffers of the algorithm with the subdivision scheme on the HP processor.

Generally speaking, the subdivision scheme reduces the total computation time. This is because the image layers after the top-layer extraction tend to be smaller and smaller in the frame buffer. With the subdivision scheme, a fraction of the frame buffer can be read as necessary and at the same time, the scanning area gets smaller. However, there are a few models like the sphere which are too symmetric for any performance improvement to be observed with the present invention. FIG. 5 shows the percentage of the overall execution time spent on scanning layers and reading frame buffers of the algorithm with and without the subdivision scheme on Octane and HP processors. FIGS. 5(a), (b), (c) and (d) list the percentage of the time spent on scanning layers and reading buffers for the two algorithms on the two machines. Scanning layers and reading buffers take most of the execution time. While the total percentage of time spent on scanning and reading the buffers is similar between the two architectures, it can be observed in FIG. 3 that the scanning time dominates in the SGI Octane, while in the HP, reading time is significantly higher. The most important reason for this discrepancy can be attributed to significant difference in the processor speeds. In most cases, the subdivision scheme speeds up the performance, sometimes over four times. Table 1 shows the characteristics of the five models and their average depths for the window sizes of 256×256 and 512×512 over 30 frames.

TABLE 1

| (model) | # of vertices | # of triangles | depth win 256 | depth win 512 |
| --- | --- | --- | --- | --- |
| Bones | 2156 | 4204 | 19.7 | 18 |
| Mannequin | 689 | 1355 | 10.8 | 12.4 |
| Phoenix | 8280 | 2760 | 9.6 | 11.1 |
| Sphere | 66 | 129 | 2.8 | 2.5 |
| Spock | 1779 | 3525 | 17.7 | 18.9 |

Figure 6A:
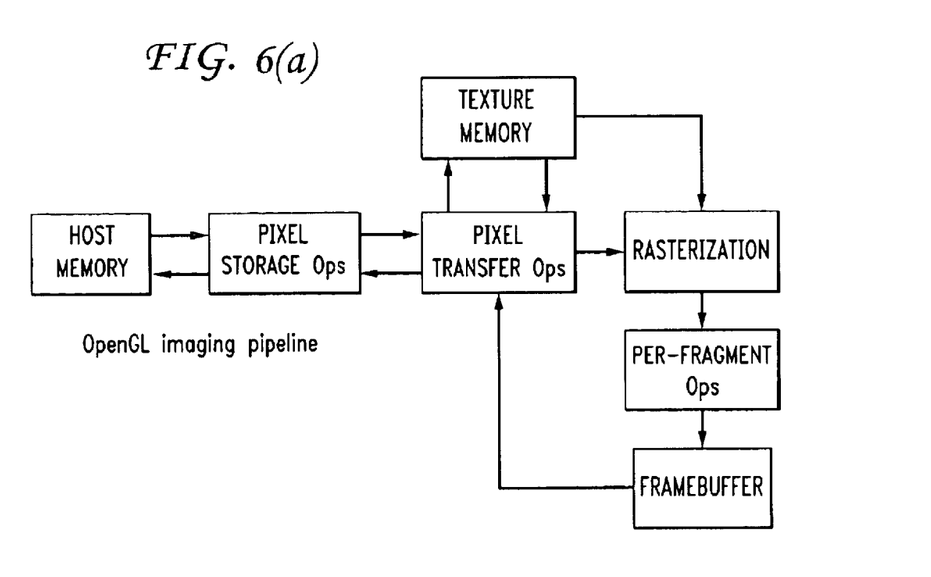
FIG. 6(a) is an exemplary embodiment of an OpenGL hardware assisted implementation.
Figure 6B:
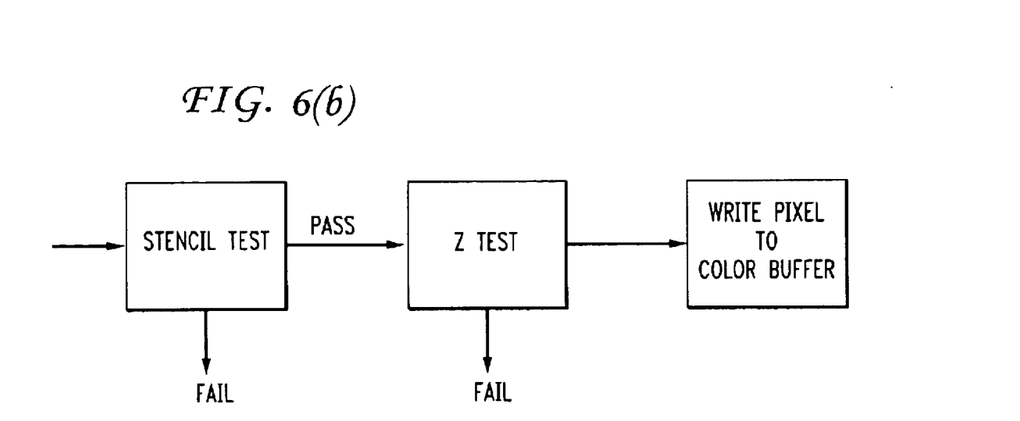
FIG. 6(b) is an exploded view of the per-fragment operations module.

FIG. 6(a) is an exemplary embodiment of an OpenGL hardware assisted implementation. The host memory of a processor interacts with a pixel storage operations module, which interacts with a pixel transfer operations module. A rasterization module receives input from both a pixel transfer operations module and a texture memory module. The texture memory module is coupled to and interacts with the pixel transfer operations module. Rasterization is the breaking of objects into fragments. Once rasterization has completed, the results are input to a per-fragment operations module, which supplies input to a framebuffer, which is where the images are actually placed. The framebuffer provides feedback to the pixel transfer operations module. The per-fragment operations module is also called the OpenGL pixel pipeline of the present invention and the subject of FIG. 6(b). In FIG. 6(b), the stencil buffer of the OpenOL hardware is tested. If the test is passed, then the z-buffer (depth) is tested and if that test is passed, then the pixel is written to the color buffer.

A hardware-assisted algorithm for visibility ordering has been presented herein. From a given viewpoint and view direction, a partial ordering of the primitives, which can then be rendered using the standard painter's algorithm, has been computed. A combination of the hardware z-, stencil and color buffers has been used to compute this ordering. The experiments conducted on a variety of models have shown significant speedups in the ordering time compared to existing methods. The two main costs associated with the present implementation are the cost of transferring the buffers to the host's main memory, and the time it takes the host CPU to scan them. It is possible to use the histogramming facility available in the ARB-imaging extension of OpenGL 1.2 to make the graphics hardware perform those computations. Unfortunately, those pixel paths are not optimized, and are often slower than our current implementation. If future hardware optimizes this functionality, it would be possible to further improve the performance of the method of the present invention.

It should be clear from the foregoing that the objectives of the invention have been met. While particular embodiments of the present invention have been described and illustrated, it should be noted that the invention is not limited thereto since modifications may be made by persons skilled in the art. The present application contemplates any and all modifications within the spirit and scope of the underlying invention disclosed and claimed herein.

What we claim is:

1. A hardware assisted method for computing a visibility ordering of a set of primitives and rendering the set of primitives, comprising the steps of:

locating primitives potentially in a layer, wherein the step of locating comprises:

initializing hardware buffers, initializing a layer number, assigning said layer number to each primitive, extracting a subset of said primitives from said set of primitives assigned to said layer number, and storing said subset of primitives in a color buffer; and removing occluded primitives from the layer, wherein the step of removing comprises the steps of:

reading said color buffer to locate all primitives of said layer number;

traversing a pixel array of said subset of primitives to obtain primitive ids and depth complexities;

testing depth complexity for each primitive using a stencil buffer;

removing those primitives from said layer number if said depth complexity is greater than one;

re-inserting said primitives with a depth complexity greater than one back into said set of primitives;

rendering said primitives of said layer number;

incrementing said layer number;

determining if any primitives have been extracted from said set of primitives in said layer number;

halting execution if no primitives have been removed from said layer number; and repeating all of said above steps in said step of removing.

2. The method according to claim 1, wherein said method is a front-to-back algorithm.

3. The method according to claim 1, wherein said method is a back-to-front algorithm.

4. The method according to claim 1, wherein said hardware buffers are OpenGL hardware buffers.

5. The method according to claim 4, wherein said OpenGL hardware buffers include a color buffer, a stencil buffer and a z-buffer.

6. The method according to claim 5, further comprising the steps of:

clearing said color buffer;

disabling said stencil buffer; and configuring and setting said z-buffer to far.

7. The method according to claim 5, after said re-inserting step, further comprising the steps of:

clearing and enabling said stencil buffer;

clearing said color buffer; and clearing said z-buffer.

8. The method according to claim 1, further comprising the step of subdividing an image consisting of said set of primitives.

9. The method according to claim 1, wherein said set of primitives is acyclic.

10. A system for computing a visibility ordering of a set of primitives and rendering said set of primitives comprising:

a host processor having a host memory, the host memory including machine readable instructions which when executed by the processor, locate primitives potentially in a layer, wherein the step of locating comprises: initializing hardware buffers, initializing a layer number, assigning said layer number to each primitive, extracting a subset of said primitives from said set of primitives assigned to said layer number, and storing said subset of primitives in a color buffer; and removing occluded primitives from the layer, wherein the step of removing comprises the steps of: reading said color buffer to locate all primitives of said layer number; traversing a pixel array of said subset of primitives to obtain primitive ids and depth complexities; testing depth complexity for each primitive using a stencil buffer; removing those primitives from said layer number if said depth complexity is A greater than one; re-inserting said primitives with a depth complexity greater than one back into said set of primitives, rendering said primitives of said layer number; incrementing said layer number; determining if any primitives have been extracted from said set of primitives in said layer numberl; halting execution if no primitives have been removed from said layer number; and repeating all of said above steps;

a pixel storage operations module coupled to and interacting with said host memory;

a pixel transfer operations module coupled to and interacting with said pixel storage operations module;

a rasterization module for breaking primitives into fragments, said rasterization module coupled to and interacting with said pixel transfer operations module;

a texture memory module coupled to interacting with said pixel transfer operations module, said texture memory module further coupled to and interacting with said rasterization module;

a per-fragment operations module coupled to and interacting with said rasterization module; and a framebuffer coupled to and interacting with said per-fragment module, said framebuffer further providing feedback to said pixel transfer operations module.

11. The system according to claim 10, wherein said per-fragment operations module further comprises:

a stencil buffer;

a z-buffer; and a color buffer.

12. The system according to claim 10, wherein said system supports a front-to-back algorithm.

13. The system according to claim 10, wherein said system supports a front-to-back algorithm.

14. The system according to claim 10, wherein said set of primitives is acyclic.

15. A system for computing a visibility ordering of a set of primitives and rendering said set of primitives comprising:

a first controller for locating primitives potentially in a layer, wherein said first controller performs functions comprising the steps of:

initializing hardware buffers;

initializing a layer number;

assigning said layer number to each primitive;

extracting a subset of said primitives from said set of primitives assigned to said layer number; and storing said subset of primitives in a color buffer in computer readable memory; and a second controller for removing occluded primitives from the layer, wherein said second controller performs functions comprising the steps of:

reading said color buffer to locate all primitives of said layer number;

traversing a pixel array of said subset of primitives to obtain primitive ids and depth complexities;

testing depth complexity for each primitive using a stencil buffer;

removing those primitives from said layer number if said depth complexity greater than one;

re-inserting said primitives with a depth complexity greater than one back into said set of primitives;

rendering said primitives of said layer number;

incrementing said layer number;

determining if any primitives have been extracted from said set of primitives in said layer number;

halting execution if no primitives have been removed from said layer number; and repeating all of said above steps for removing occluded primitives from the layer.

16. The system according to claim 15, wherein said system supports a front-to-back algorithm.

17. The system according to claim 15, wherein said system supports a back-to-front algorithm.

* * * * *